(12) United States Patent
Nechitailo

(10) Patent No.: US 7,956,733 B1
(45) Date of Patent: Jun. 7, 2011

(54) OPTICAL FIBER SENSOR FOR QUANTITATIVE MONITORING OF DEFLECTION FROM HIGH-SPEED LAUNCHER OPERATION CONDITIONS

(75) Inventor: Nicholas V. Nechitailo, King George, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 456 days.

(21) Appl. No.: 12/286,281

(22) Filed: Sep. 23, 2008

(51) Int. Cl.
*G08B 23/00* (2006.01)
(52) U.S. Cl. .................. 340/500; 250/227.14; 244/3.1
(58) Field of Classification Search ............... 340/500, 340/661; 250/216, 227.11, 227.14; 244/3.1
See application file for complete search history.

(56) References Cited

U.S. PATENT DOCUMENTS

| | | | |
|---|---|---|---|
| 4,611,771 A | 9/1986 | Gibbons et al. | 244/3.12 |
| 5,035,375 A | 7/1991 | Friedenthal et al. | 244/3.12 |
| 5,251,002 A | 10/1993 | Gryk | 356/73.1 |
| 5,528,409 A | 6/1996 | Cucci et al. | 359/171 |
| 5,942,750 A | 8/1999 | Sangerhaugen et al. | 250/227.14 |
| 6,388,248 B1 | 5/2002 | Gibbs et al. | 250/227.23 |
| 6,681,073 B2 | 1/2004 | Chan et al. | 385/140 |
| 7,038,192 B2 | 5/2006 | Lu et al. | 250/231.13 |

*Primary Examiner* — Jeffery Hofsass
(74) *Attorney, Agent, or Firm* — Gerhard W. Thielman, Esq.

(57) ABSTRACT

A measurement system is provided to monitor a launcher assembly along a path along which to accelerate a projectile. This system includes an optical sensor, a light emitter, a light detector and a signal analyzer. The sensor is continuously disposed on (or integrated to) the assembly at a position on the path and has initial and terminus ends. The light emitter transmits an optical signal from the initial end. The light detector receives the optical signal from either the initial or terminus ends. The signal analyzer compares the optical signal from the detector to a quantifiable deflection of the assembly launcher. The signal analyzer issues an alarm indication in response to the quantifiable deflection exceeds a hazard-condition threshold. The sensor may be positioned either substantially parallel to or transverse at discrete points along the path and be disposed longitudinally along and/or wrapped helically around the launcher barrel.

12 Claims, 10 Drawing Sheets

| Test # | Maximum Displacement, mm | | | Speed at Maximum Displacement, km/s | | | Speed Range km/s | Maximum vonMises Stress, GPa | | | Speed at Maximum Stress, km/s | | |
|---|---|---|---|---|---|---|---|---|---|---|---|---|---|
| | Rail | Support | Tube | Rail | Support | Tube | | Rail | Support | Tube | Rail | Support | Tube |
| 1 | 18.6 | 18.6 | 6.29 | 0.98 | 0.98 | 1.63 | 0.65 | 4.63 | 2.65 | 6.07 | 1.02 | 0.94 | 1.59 |
| 2 | 35.7 | 32.9 | 3.75 | 1.06 | 1.08 | 1.55 | 0.49 | 6.69 | 8.20 | 3.30 | 1.24 | 1.18 | 1.51 |

OPTICAL FIBER SENSOR FOR QUANTITATIVE MONITORING OF DEFLECTION FROM HIGH-SPEED LAUNCHER OPERATION CONDITIONS

STATEMENT OF GOVERNMENT INTEREST

The invention described was made in the performance of official duties by one or more employees of the Department of the Navy, and thus, the invention herein may be manufactured, used or licensed by or for the Government of the United States of America for governmental purposes without the payment of any royalties thereon or therefor.

BACKGROUND

The invention relates generally to monitoring systems for electromagnetic launcher axial components, and more particularly to such configurations that preferably can provide continuous condition measurements of launcher barrels from launching a projectile at high speed. Such conditions for measuring include dynamic deformation, temperature, strain and humidity.

An electromagnetic launcher (e.g., barrel accelerator) utilizes electromagnetic force to propel an electrically conductive payload. Electrically conductive rails may be disposed in a longitudinal launch direction from breech to muzzle ends of the launcher. Electric current flowing through the rails induces a magnetic field that produces a mutual repulsion Lorenz force between the rails and accelerates the payload (armature and projectile) along at least one of the rails. The armature pushes the projectile for release through the muzzle.

Laboratory railguns have demonstrated launch velocities of over 2 km/s, considerably above those normally achieved in conventional propellant guns. Such velocities enable both increased range and elimination of energetic materials for propulsion. Physical and design constraints limit launch speeds and rail performance after firing multiple loads without structural or operational failure, which often necessitates post-mortem investigation of system fragments that have suffered damage from the intended operation.

Experiments with various high-speed accelerators reveal existence of critical speeds causing group resonance with significant localized bending and buckling in barrels. These result in high tensile stress, creation of gouges, pits and cracks along rails, delamination of insulators, possible arc generation with high localized temperatures.

SUMMARY

Ideal sensors to monitor deformation and temperature should survive harsh field environment and to be immune to strong electromagnetic fields. Sensors should have high sampling rate, reasonably wide strain range, reasonably high resolution, short acquisition time, and several channels to duplicate data (in the case if one of the channels or one fiber fails). Sensors are often divided into two groups: (1) Point sensors such as Fiber Bragg grating (FBG) sensors, traditional foil strain gauges and accelerometers that can be used as point sensors for localized measurements and structural health monitoring.

These sensors are normally installed in "suspicious" or "best guess" points. Longer barrel structures may employ many (from ten to one-hundred) point sensors to collect data along the whole length or area of a larger structure, which can be cost prohibitive. (2) Continuous distributed full-length or full-area sensors include embedded or wrapped continuous optical fibers to be used for the measurements and structural health monitoring of the whole structure. In the current invention the preferred embodiment is distributed optical fiber sensors.

Conventional barrel condition monitoring yield disadvantages addressed by various exemplary embodiments of the present invention. In contrast, various exemplary embodiments introduce fiber optic sensors into components for a launcher to monitor structural response to dynamic loading, including buckling and induced temperature (from frictional heating). Consequently, the launcher rails can be repaired and/or replaced prior to onset of damage that can degrade acceleration performance of a payload. The operational life of the rails and launcher may be significantly extended thereby.

Additionally, continuous monitoring of strain and temperature of the launcher enables detection of excessive deformation and/or temperature levels, thereby serving as a diagnostic tool with which to interrupt operation to avoid serious damage. In particular, the launcher provided for accelerating a projectile from an initial speed at a breech end to a launch speed at a muzzle end includes an electrically conductive rail equipped with fiber optic cable or fiber optic ribbon (an array of several parallel fibers encased in a matrix polymer) to measure transverse loads.

Various exemplary embodiments provide a system and a method for monitoring barrel deflection. This measurement system may be used to monitor a launcher assembly along a path along which to accelerate a projectile. This system includes an optical sensor, a light emitter, a light detector and a signal analyzer. The optical sensor is disposed in the barrel assembly at a position on the path and has initial and terminus ends.

The light emitter transmits an optical signal from the initial end. The light detector receives the optical signal from either the initial or terminus ends. The signal analyzer compares the optical signal from the detector to a quantifiable deformation and temperature in the barrel. For example, the signal analyzer may issue an alarm indication in response to a detectable deflection exceeding a hazard-condition threshold. The optical sensor preferably includes long multi-mode or single-mode fiber, or long fiber Bragg grating between the initial and terminus ends. The fiber may be disposed along or wrapped (in helical fashion) around the length of the critical barrel components.

BRIEF DESCRIPTION OF THE DRAWINGS

These and various other features and aspects of various exemplary embodiments will be readily understood with reference to the following detailed description taken in conjunction with the accompanying drawings, in which like or similar numbers are used throughout, and in which.

DETAILED DESCRIPTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Various exemplary embodiments provide for improvements in design and performance of launchers (including e.g., electromagnetic rail-guns). Such embodiments accomplish these objectives by providing a long continuous optical fiber to measure deformation and temperature of the launcher during operation.

Figure 1:
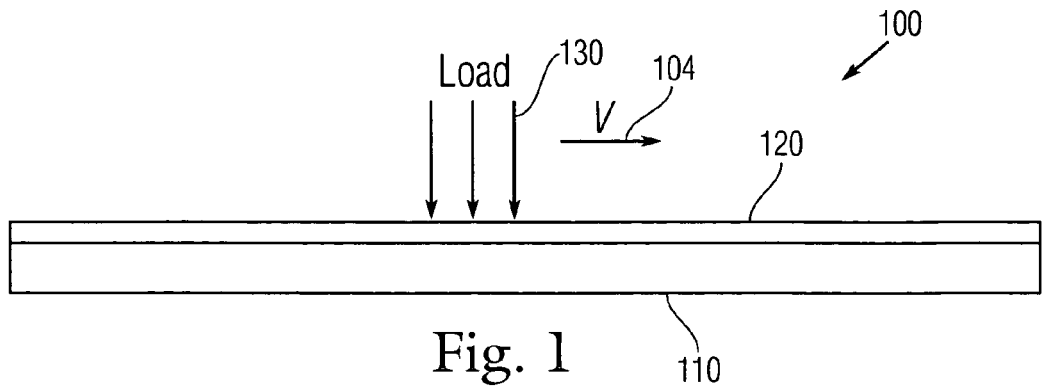
FIG. 1 is an elevation longitudinal view of a dynamically loaded rail.

FIG. 1 shows an elevation view of a load-bearing rail 100 for a high-speed projectile launcher. The rail includes an elastic foundation 110 with a rail's glide surface 120 superimposed thereon. A transverse load 130 translates along the surface 120 at a monotonically increasing velocity 140 denoted as V. As the load speed approaches critical velocity (that depends on geometry and material properties), the load can induce resonant bending and buckling of the rail. The foundation (or insulator) 110 can exhibit damaging resonant bending and buckling at its critical velocity, and can be modeled as a series of springs and dampers that support the surface 120 of the rail.

The dynamic bending of the rail 100 can be modeled as a Bernoulli-Euler Beam based on the relation for the surface 120:

$$EI\frac{\partial^4 w}{\partial x^4} + \rho A \frac{\partial^2 w}{\partial t^2} + k_f w = 0, \quad (1)$$

where w is transverse deflection, E is the modulus of elasticity, I is the cross-section moment of inertia, A is the cross-section area, $\rho$ is the mass density, $k_f$ is the modulus of the elastic foundation 110 and t is time. This yields a solution for critical velocity $V_{cr}$ for the rail related to compressive force that causes buckling:

$$V_{cr} = \sqrt{\frac{2\sqrt{EIk_f}}{\rho A}}. \quad (2)$$

Figure 2:
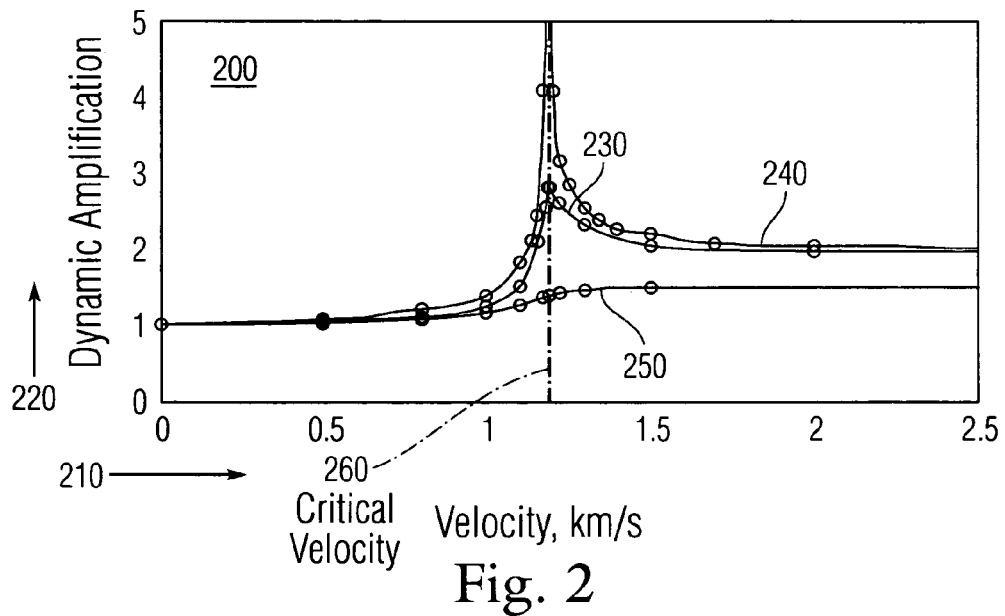
FIG. 2 is a graphical view of displacement amplification of the rail with respect to load speed.

Damping provided by the elastic foundation 110 attenuates the dynamic displacement of the surface 120. FIG. 2 shows a graph 200 with velocity as the abscissa 210 and dynamic displacement amplification as the ordinate 220. The plotted lines include responses for undamped 230, 2% damped of critical 240 and 20% damped of critical. The peaks correspond to the critical velocity $V_{cr}$ denoted by a dash line 260 at 1.2 km/sec for the example geometry and material evaluated.

Figures 3A, 3B:
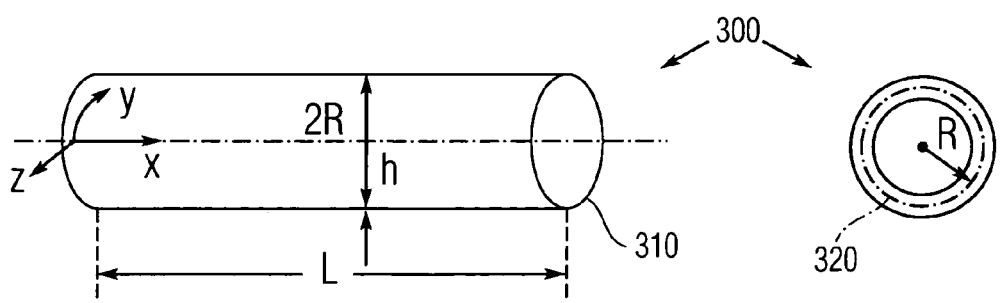
FIGS. 3A and 3B are elevation views of a tubular barrel.

Similarly, analytical solutions can be employed for thin tubes based on Timoshenko-Love and Flügge models. FIG. 3A shows a substantially longitudinal view of a cylindrical shell 300 in a local Cartesian coordinate system with x, y and z respectively representing longitudinal, angular and radial directions. FIG. 3B shows the same shell 300 from a cross-sectional view. The outer extent 310 of the shell forms the rim projecting half of the shell thickness h from the mid-circumference 320, which extends radius R from the centerline along the tube's axial length L. The equation of motion for the Timoshenko-Love shell can be expressed as:

$$\frac{Eh}{1-\gamma^2}\left(\frac{\partial^2 u}{\partial x^2} - \frac{\gamma}{R}\frac{\partial^2 u}{\partial t^2}\right) = \rho h \frac{\partial^2 u}{\partial t^2} \quad (3)$$

$$\frac{Eh^3}{12(1-\gamma^2)}\frac{\partial^4 w}{\partial x^4} + \frac{Eh}{(1-\gamma^2)}\left(\frac{w}{R}\gamma\frac{\partial u}{\partial x}\right) = P - \rho h \frac{\partial^2 w}{\partial t^2}, \text{ and}$$

where u is longitudinal velocity and y is Poisson's ratio (sometimes denoted in the literature as v). The corresponding tube critical velocity $V_{ct}$ to cause buckling can be written:

$$V_{ct} = \sqrt{\frac{Eh}{\rho R\sqrt{3(1-\gamma^2)}}} - \frac{h}{R}\sqrt{\frac{E\gamma^2}{6\rho(1-\gamma^2)}} + \ldots, \quad (4)$$

with the ellipses denoting higher order terms.

Figures 4, 5:
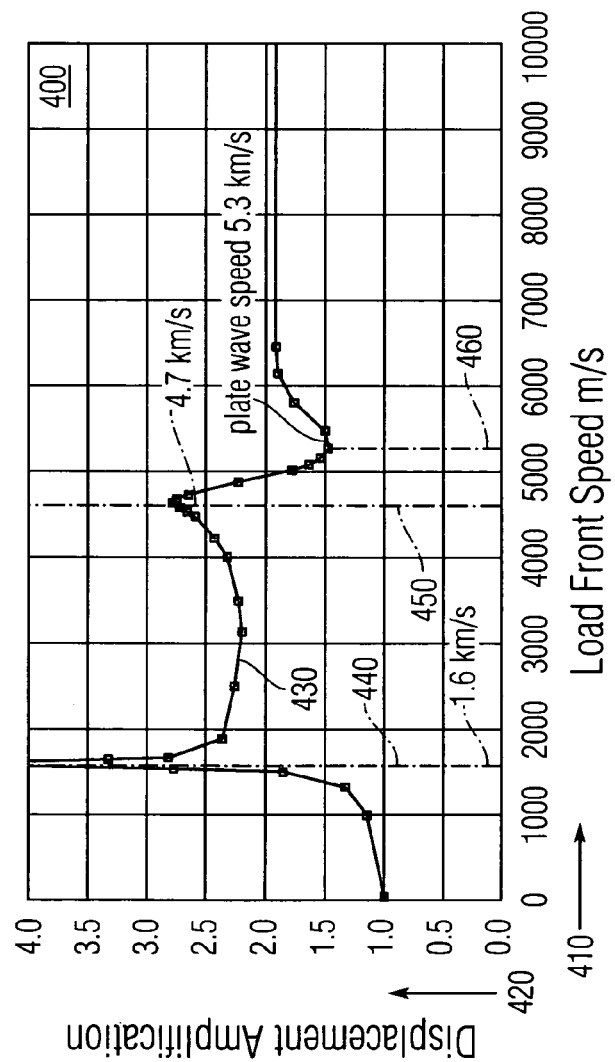
FIG. 4 is a graphical view of displacement amplification of the tube with respect to load speed.
FIG. 5 is a tabular view of finite element simulation results.

Finite element analysis yields radial displacement in the tube subjected to semi-infinite pressure moving at constant speed along the tube length, without damping. FIG. 4 shows a graph 400 with velocity as the abscissa 410 and displacement amplification as the ordinate 420. The plotted line 430 provides tube displacement absent damping. The inflection points correspond to 2-term Timoshenko-Love critical velocity 440 at 1.6 km/sec, a secondary critical velocity 450 at 4.7 km/sec and a decrease to plate wave speed 460 at 5.3 km/sec.

FIG. 5 provides a table 500 of finite element modeling results to analyze group resonance in the rail, support and tube. The columns include test number 510, maximum displacement 520, speed at maximum displacement 530, speed range 540, maximum vonMises stresses 550 and speed at maximum stress 560. In this example, respective Young's moduli of the foundation and tube are 67 GPa and 118 GPa.

Monitoring of deformation and temperature in rail components can be used to mitigate rail damage. This can be accomplished by installing measurement instruments to visualize regions of large deformation and high temperature. Such sensors should preferably survive dynamic and thermal loads that cause high strain, chemical reaction from oxidizing flames originating at both breech and muzzle ends of the launcher, and strong electromagnetic fields.

Sensors for the measurement instrumentation should preferably have high sampling rate, wide strain range, moderate to high resolution, short response time. The data recorder should preferably have multiple channels with rapid data acquisition. For example, to satisfy the Nyquist condition with predicted strain wave frequencies of ~100 kHz, a sampling rate of 200 kHz is preferred. Strain range and resolution of ±5000 me and 30 me, respectively, are preferred. For elastic waves having a wavelength of ~3 cm, gate lengths of less than one centimeter (<1 cm) are acceptable. The duration of the launcher operation plus additional time to capture remaining waves can be acquired within somewhat more than 10 milliseconds.

Continuous distributed sensors can be used for localized measurements and structural monitoring. Lengthy structures (i.e., having high aspect ratio between longitudinal and transverse dimensions) may employ several such sensors to collect data along the entire structure. These can be distributed uniformly or concentrated at analytically derived: regions, such as locations at which acceleration yields speeds approaching the critical velocity. Point instruments include fiber Bragg grating (FBG) sensors, traditional foil strain gauges and accelerometers.

Various point instruments have advantages and disadvantages, depending on application. For example, foil strain gages and FBG sensors have higher strain ranges and better frequency responses than Fabry-Perot sensors. By contrast, Fabry-Perot sensors and FBG sensors have higher strain sensitivity resolutions, better durability, lower complexity and improved electromagnetic interference immunity over foil strain gages. However, FBG sensors cost more than their competing counterparts.

Figure 6A:
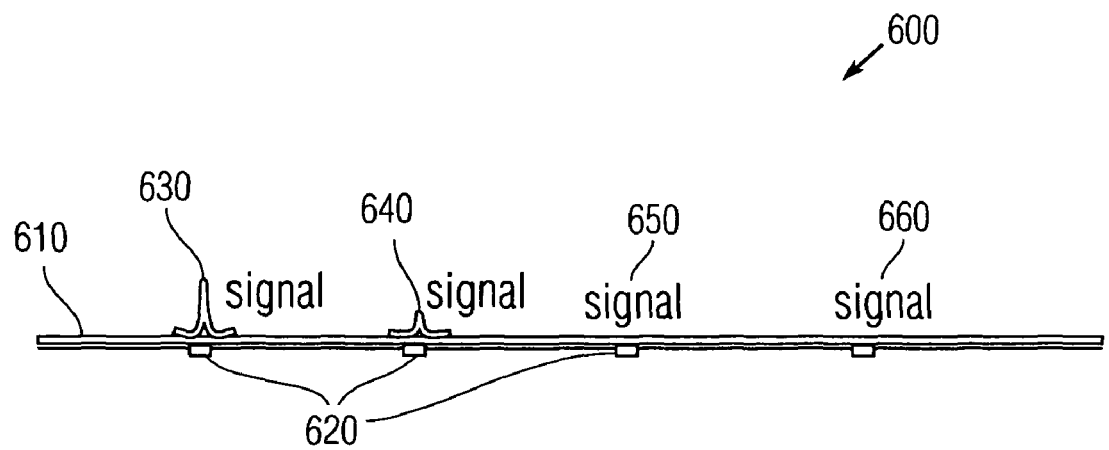
FIGS. 6A and 6B are schematic views of point and continuous distributed sensors.
Figure 6B:

FIGS. 6A and 6B compare two types of sensor assemblies 600 for monitoring structural response. FIG. 6A shows a rail 610 with several attached point sensors 620 disposed longitudinally. Strong-amplitude signals 630, 640 indicate location of the critical-velocity region, in contrast to weak-amplitude signals 650, 660. FIG. 6B shows a rail 670 with a continuous long-fiber sensor to collect deformation along the entire length, with peaks 680, 690 as shown. The continuous sensor can provide more complete information of local signal peaks than available from several point sensors.

Figure 7A:
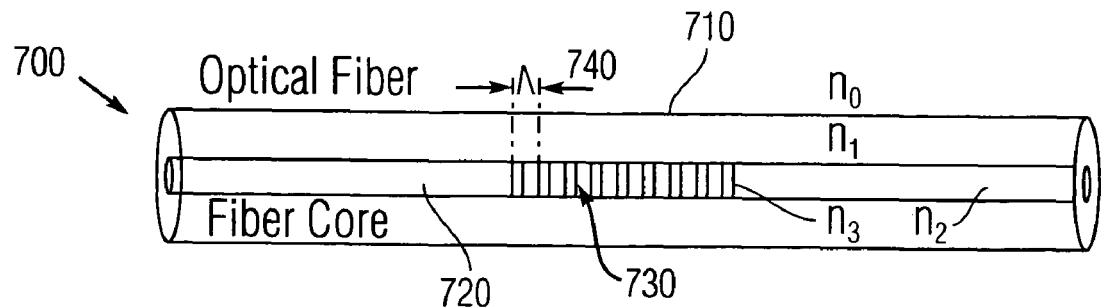
FIG. 7A is a longitudinal view of a fiber Bragg grating (FBG) sensor.
Figure 7B:
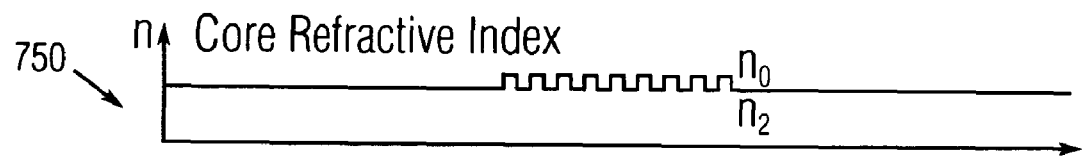
FIGS. 7B and 7C are longitudinal views of refractive index and spectral responses from an FBG sensor.
Figure 7C:
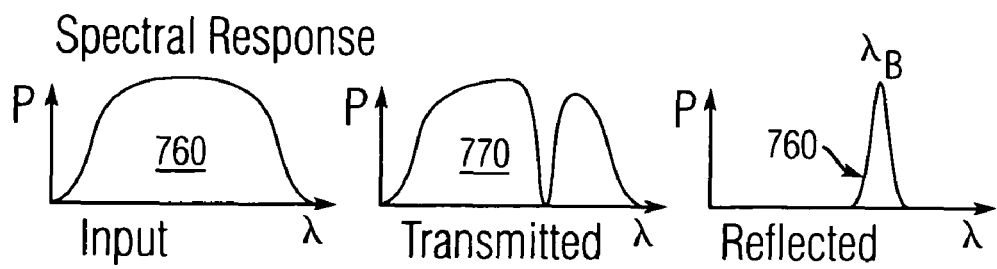

FIG. 7A shows an optical fiber 700 with FBG within a short segment that reflects particular wavelengths of light and transmits the remainder of the spectrum. Thus, the FBG behaves as a frequency filter. The fiber includes an outer casing 710 within which is a fiber core 720. A segment 730 of the core 720 includes grating having a grate period 740 of Λ. FIG. 7B shows a plot 750 of the core refractive index n as a function of the fiber length, fluctuating by an offset amount. The refractive index possesses two primary characteristics: the refractive index profile, which can be uniform or apodized (i.e., smoothed), and the offset, which typically is positive or zero. FIG. 7C shows plots of the spectral response by amplitude P as a function of electromagnetic wavelength λ, to compare input 760, output transmit 770 and output reflect 780 concentrated at a filtered wavelength $\lambda_B$.

Figure 8A:
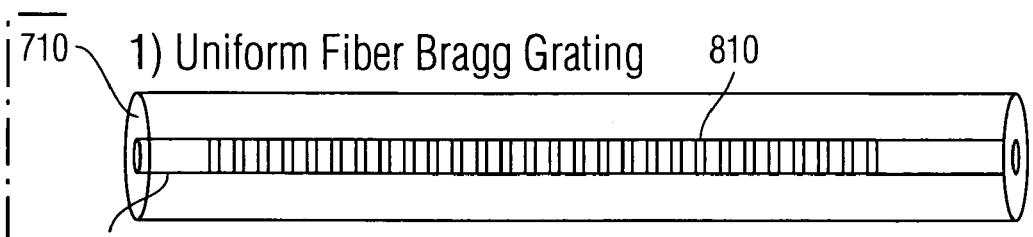
FIGS. 8A through 8D are longitudinal views of FBG configurations.
Figure 8B:
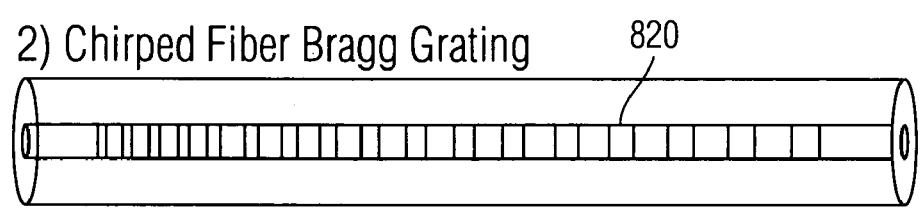
Figure 8C:
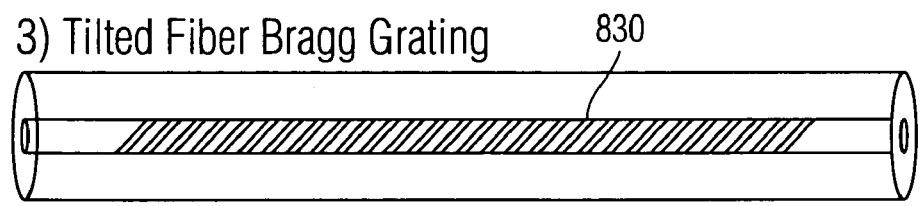
Figure 8D:
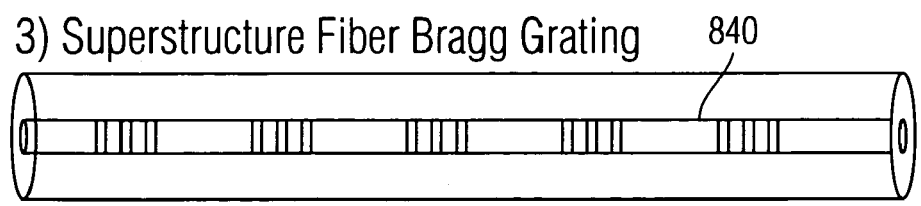

FIGS. 8A through 8D show fibers 800 with exemplary FBG distributions. FIG. 8A shows a fiber 720 having uniform FBG 810. FIG. 8B shows chirped FBG 820 for shifting wavelengths to be filtered. FIG. 8C shows tilted FBG 830. FIG. 8D illustrates distributed groups referred to as superstructure FBG 840.

Figure 9:
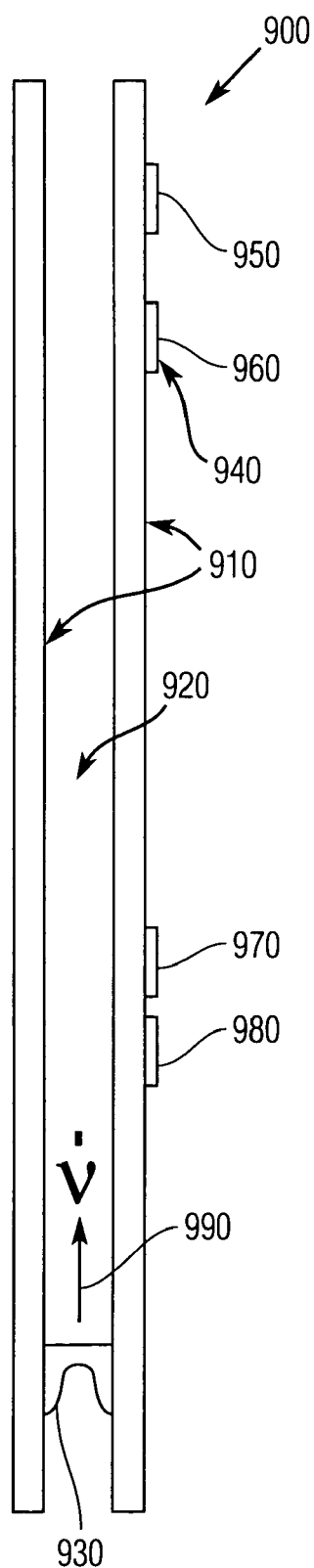
FIG. 9 is an upright elevation view of an electromagnetic launcher.

FIG. 9 shows an accelerator 900 having parallel rails 910 sandwiching a chamber 920 therebetween through which an armature 930 passes. FBG sensors 940 are disposed on at least one of the rails 910 at various positions along its length. These include sensors at positions farthest down-stream 950 neighboring the muzzle at 1.3 m from the armature 930, and adjacent thereto 960 at 1.1 m from the armature 930, as well as neighboring the breech 970 at 0.4 m from the armature 930 and adjacent thereto 980 at 0.3 m from the armature 930, which travels 990 through the chamber 920 accelerating at dv/dt.

Figure 10:
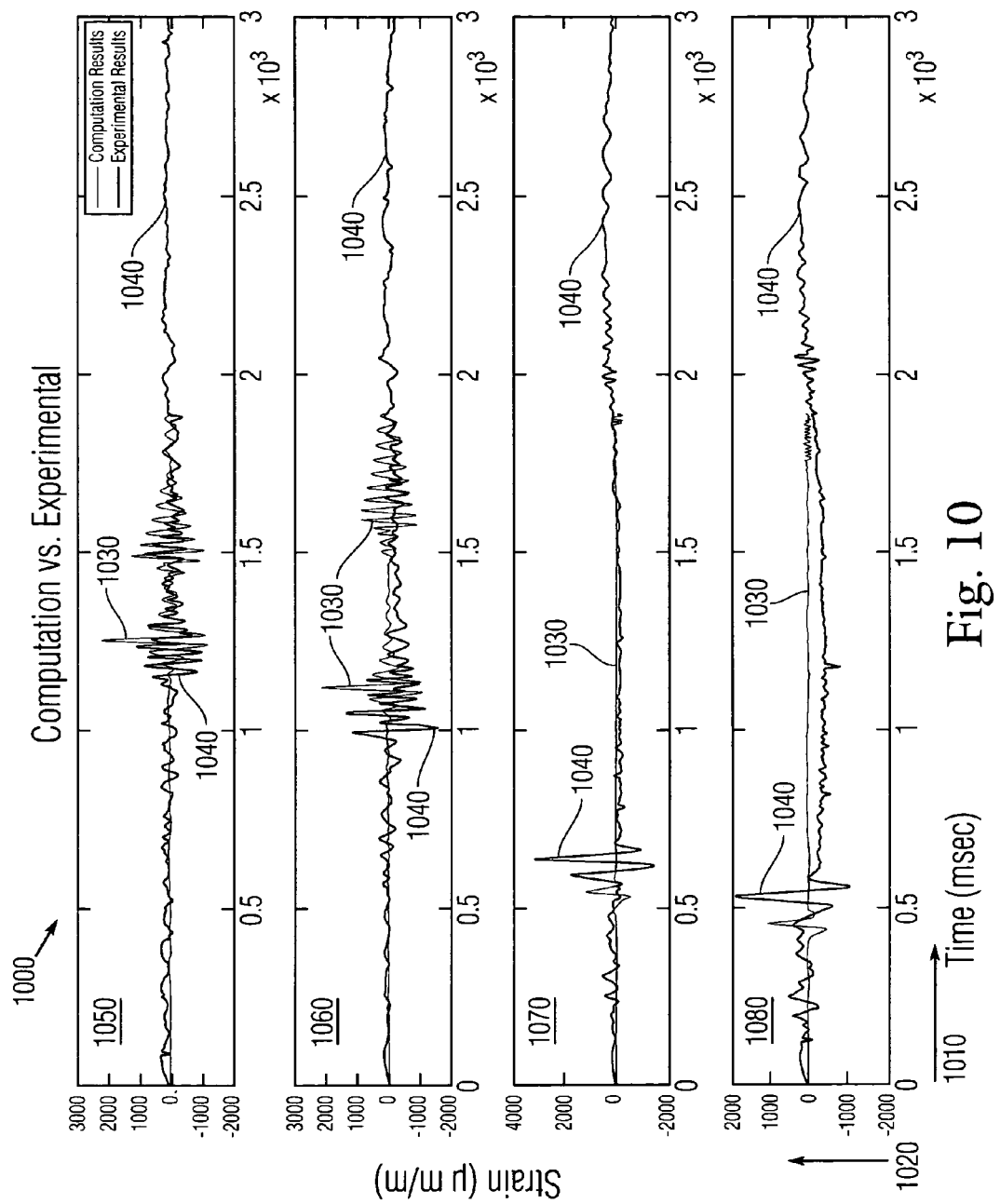
FIG. 10 is a graphical view comparing simulated and empirical responses to dynamic loading.

FIG. 10 shows graphs 1000 comparing computational (simulated) and experimental (empirical) results with time denoting the abscissa 1010 and normalized strain as the ordinate 1020. The legend-identified lines include computational 1030 and experimental 1040, the latter of which denote generally somewhat higher magnitudes than the former. The graphs 1000 include plot 1050 corresponding to sensor position 950, plot 1060 for sensor 960, plot 1070 for sensor 970 and plot 1080 for sensor 980. The second set of resonances at about 1.5-1.7 msec in plots 1050 and 1060 indicate reflected computational waves being damped during the experiment. Wave radiation at 0.6 msec in plot 1070 appeared at a lower velocity in the experiment than computed. Amplitude differences, particularly those exhibited in plots 1070 and 1080 can be attributed to simplified armature model in the computations.

Figure 11:
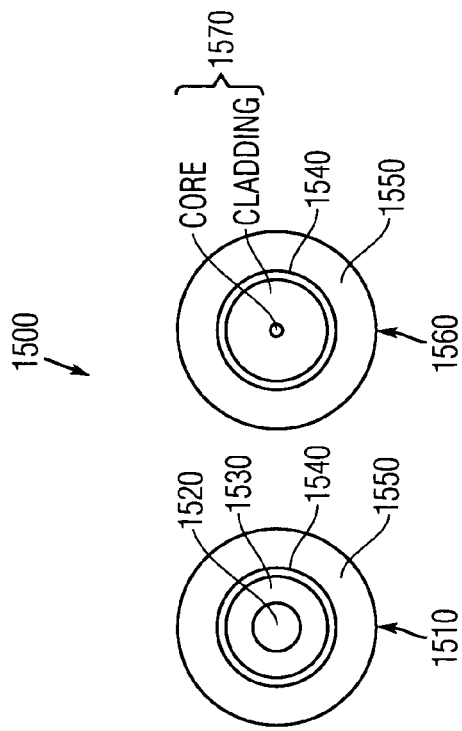
FIG. 11 is an elevation view of tubular barrel at critical speed of a moving pressure front.

The distortion along the launcher barrel 1100 is shown in FIG. 11 to visualize displacement measurable by sensors. The tube geometry 1110 (shown in cross-section) is characterized by a radial distance R from the axial centerline. At critical speed, the pressure field 1120 pushes against the surface 1110 along a moving pressure front 1130, thereby displacing the surface 1110, with a distortion wave region 1140 having a length of approximately 4R in the vicinity of the front 1130.

Optical fiber sensors (e.g., FBG type) can be used continuously along the barrel length, embedded or wrapped around critical components or locations along the launcher, or alternatively as point sensors distributed along the length. Such wrapping can include disposing a fiber in helical fashion around the launcher structure. These sensors can employ optical glass or polymer fibers and be incorporated in fiber ribbons, with arrays of parallel fibers embedded in a plastic matrix. Such sensors would possess high aspect ratio.

Figure 13:
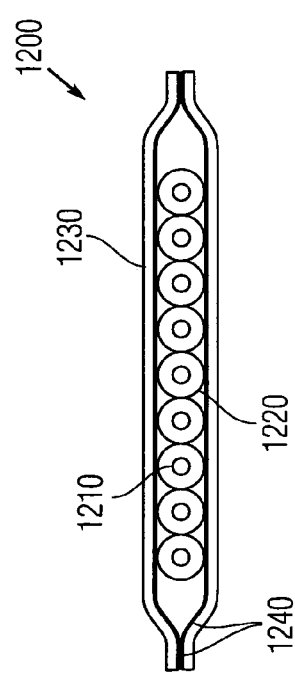
FIGS. 12 and 13 are respective cross-section and isometric views of fiber optic ribbon.
Figure 12:
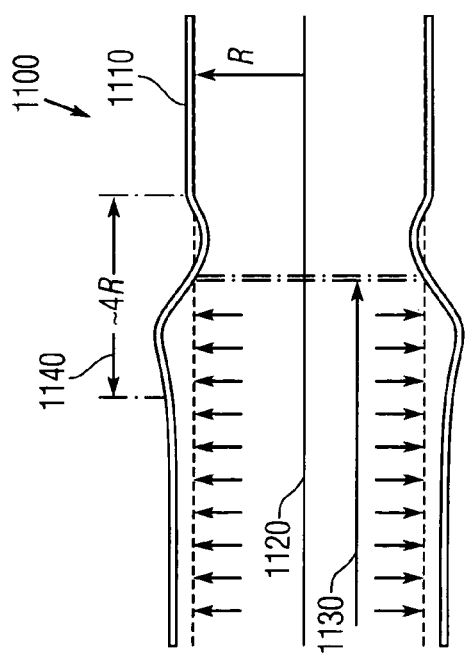

FIGS. 12 and 13 respectively show cross-sectional and perspective views of a fiber ribbon. FIG. 12 features the cross-section ribbon 1200 with series of fibers, each with fiber and core/cladding 1210 and fiber coating 1220. The series are encased in a polyester tape 1230, with the cables held in relative serial position and sealed by adhesive 1240. The ribbon 1200 contains the plurality of optical fibers enveloped within the tape sheath 1230 and transversely arranged in linear series. FIG. 13 shows the ribbon 1300 with the fibers 1310 linearly arranged surrounded by a plastic matrix 1320 (e.g., tape or ribbon).

Conventional optical fibers are available in single-mode or multi-mode. Single-mode fibers usually operate in the 1310-nm or 1550-nm regions, where attenuation is lowest. This renders single-mode fibers the preferred choice for long distance communications. Multimode fibers operate primarily at 850-nm and sometimes at 1300-nm. Multimode fibers are designed for short distance use; the higher attenuation at 850-nm is offset by the use of more affordable optical sources (the lower the wavelength, the less expensive the optics). The three principal windows of operation include the 850-nm, 1310-nm, and 1550-nm wavelength bands.

Figure 14:
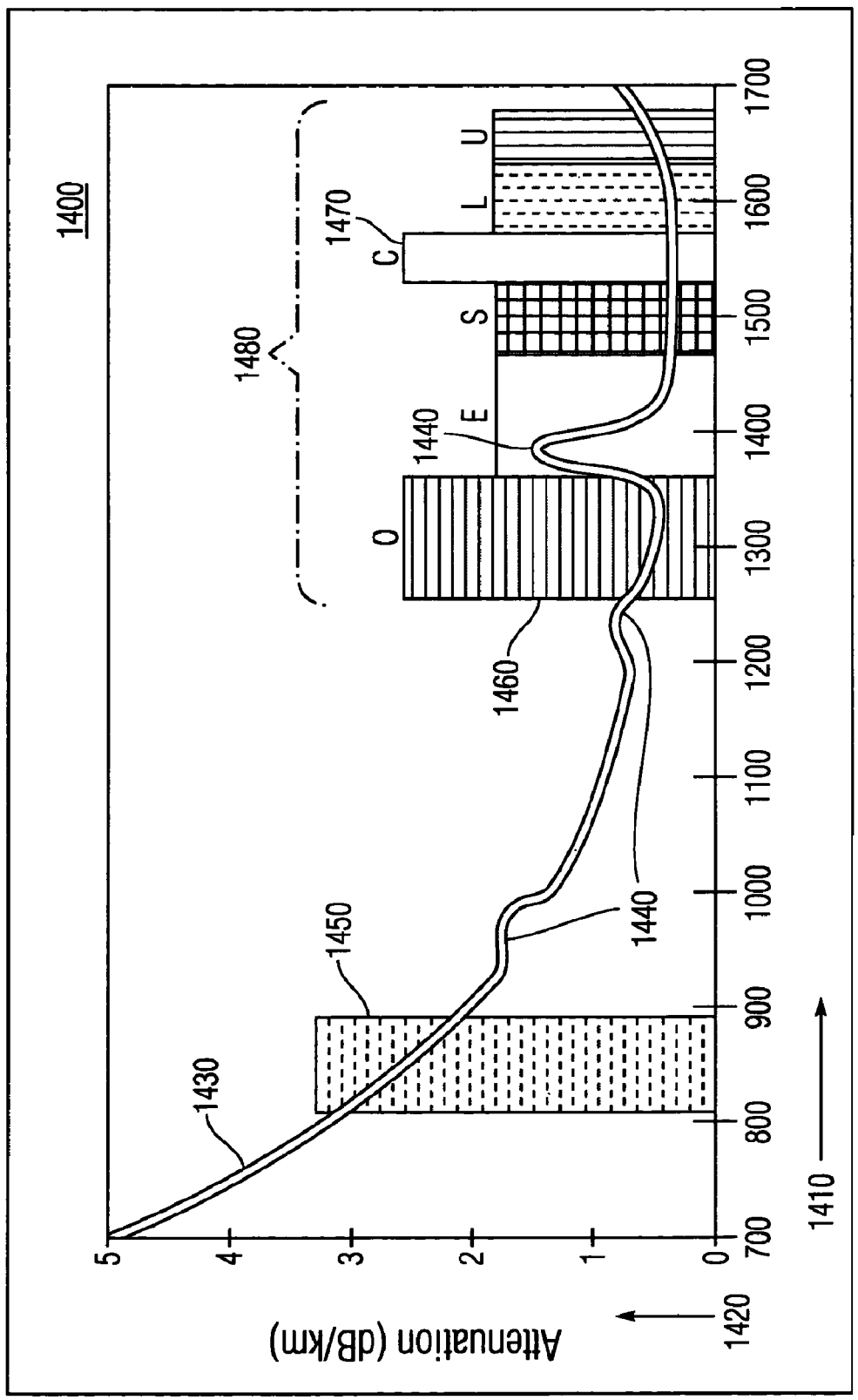
FIG. 14 is a bar-chart of optical attenuation with respect to infrared wavelength.

These windows are observable in FIG. 14 illustrating a bar-chart 1400 of attenuation with wavelength as the abscissa 1410 against the attenuation as the ordinate 1420. The solid line 1430 represents the extent to which the atmosphere interferes with electromagnetic transmissivity from infrared through visible wavelengths, including water peaks 1440 that contribute to scattering or absorption. Windows 1450, 1460 and 1470 respectively denote near-infrared and O-medium-infrared and C-medium-infrared bands of operation. Operating bands 1480 ranging from ~1250-nm to 1680-nm include the O and C windows 1460, 1470.

Figure 15:
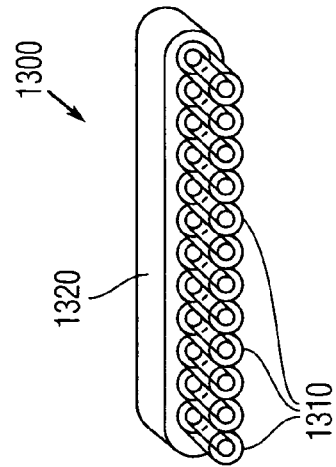
FIG. 15 is a cross-section view of multi-mode and single-mode fibers.

FIG. 15 shows cross-sectional examples 1500 of these modes. The multi-mode configuration 1510 includes a core 1520 in the center, covered by cladding 1530 that is enveloped by an outer layer 1540 and surrounded by an outer protective coating 1550. The single mode configuration 1560 includes a smaller core coated by cladding, both formed of glass 1570, surrounded by outer layer 1540 and coating 1550. The core 1520 can be grated to provide FBG filtering, as described above.

Figure 16:
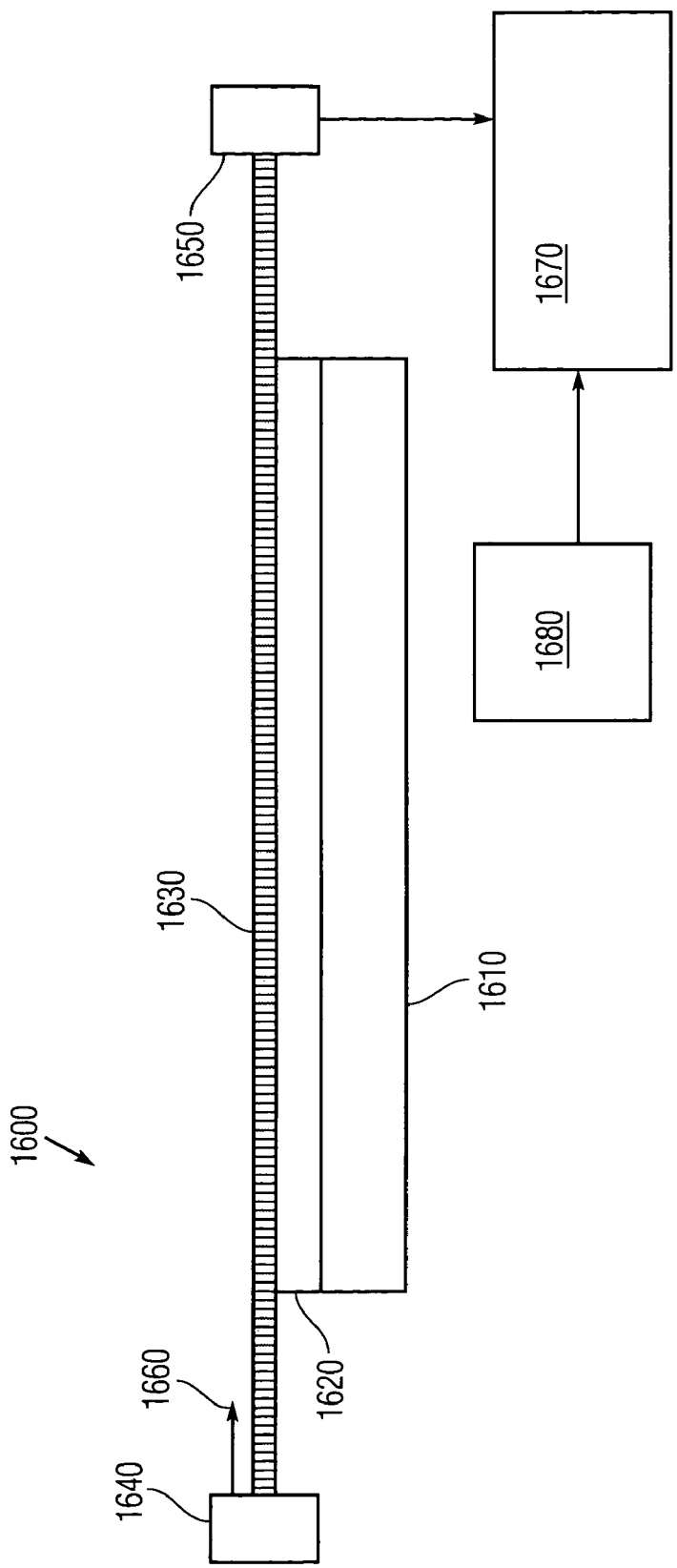
FIG. 16 is a block diagram of an optical measurement system.

A monitoring system representing an embodiment for measuring launcher deflection can be described generally as follows. FIG. 16 shows an exemplary system 1600 with a continuous optical fiber associated therewith (i.e., disposed thereon and/or integrated therein). Alternate configurations can be envisioned by disposing the additional point sensors substantially at distinct locations. The system provides a foundation 1610 to support a rail 1620 onto which is disposed a fiber optic sensor 1630 to measure rail deflection (and installed in a manner to avoid interference with the armature and/or its payload to be accelerated) for example, in grooves cut into the supporting insulator.

For an open-loop configuration, a light emitter 1640 (such as a laser) and a detector 1650 are respectively disposed at initial and terminal ends of the fiber optic sensor 1630. The emitter 1640 transmits an optical signal 1660 that travels along the fibers and received by the detector 1650. Depending on the magnitude of transverse deflection of barrel components caused by the moving load and temperature, the fibers may also deform. In a preferred embodiment of the structural monitoring system, an analyzer 1670 compares the received signal from the detector 1650 against corresponding deflection conditions, as optionally stored in a database 1680, and issues a warning indication in response to deflection that exceeds an acceptable threshold.

Microbending and macrobending represent the most common forms of deformation in fibers. Microbends are microscopic distortions along the length of a fiber, typically caused by pinching or squeezing the fiber (by adjacent surfaces of the barrel components). Microbends deform the fiber's core slightly, causing light to escape at these deflections. In single-mode fiber, microbending is wavelength-dependant, with microbend sensitivity increasing as you move to higher wavelengths like 1550-nm, and especially 1625-nm. In multimode fiber, microbend sensitivity is relatively constant across the wavelength spectrum, so that 50 µm multimode fiber has more microbend sensitivity than 62.5 µm fiber due to its smaller core diameter.

Macrobending occurs when a fiber is bent (i.e., transversely deflected) in a tight radius. The bend curvature creates an angle too sharp for the light to be reflected back into the core, and some of the light escapes through the fiber cladding, causing attenuation. This optical power loss increases rapidly as the radius decreases to an inch or less. Both macrobending and microbending induce localized strain in the fiber. This bending strain affects the refractive index and the critical angle of the light ray in that specific area.

Consequently, light traveling in the core refracts out, causing attenuation or reduction of optical signal. With the use of the common Optical Time Domain Reflectometer (OTDR), the macrobending and microbending signals are distinguished from each other and thus indicate location and type of bending along the length of the fiber. Major localized bending and buckling in the structural components of the launcher barrel can be examined from the OTDR image along the fiber length. In a number of applications including high electric-power launchers, presence of water in barrels or excessive humidity present operational hazards.

In addition to the deformation induced by loads and temperature, optical fibers sense presence of water molecules that degrade their material forming OH$^-$ (hydroxyl radical) groups. In glass fibers, at the 950-nm, 1380-nm, and 2730-nm wavelengths, the presence of hydroxyl radicals causes substantial increase in attenuation. Exposure of fibers to water molecules for extended duration forms the hydroxyl (OH$^-$) ions that affect signal attenuation. Existing detection methods also include Rayleigh scattering (i.e., the scattering of light energy as it passes through the core of a fiber strand) due to the light wave electrons colliding with non-glass molecules, usually water.

In an addition embodiment, the signal analyzer uses Polarization Mode Dispersion (PMD) caused by asymmetric distortions to the fiber from a perfect cylindrical geometry. At high bit rates, typically exceeding 5 Gbps, the PMD can be used to sense mechanical stress exerted upon the fiber due to extrinsically induced bends and contact forces. Single-mode optical fiber supports one fundamental mode, which consists of two orthogonal polarization modes. This asymmetry introduces small refractive index differences for the two polarization states known as birefringence that causes one polarization mode to travel faster than the other, resulting in a difference in the propagation time, called the differential group delay (DGD). This unit of DGD describes PMD, and DGD is typically measured in picoseconds.

A fiber that acquires birefringence causes a propagating pulse to lose the balance between the polarization components. This leads to different polarization components traveling at different velocities, creating a pulse spread. Other types of signal analysis, including more than one laser and loop configuration of the fiber sensors, can be used to monitor load induced and temperature induced deformations in high-speed launchers.

Such systems and methods enable real-time analysis of deflection during operation to accelerate the armature and projectile, rather than conduct diagnostic post-operation autopsy from expended materials that remain post-test. Thus, such arrangements enable more complete information to be obtained about test operations on accelerators and launchers to thereby facilitate analysis for developing mitigation techniques to reduce transverse deflection and resultant damage to the launcher's structure.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. A measurement system for monitoring a launcher assembly along a path along which to accelerate a projectile, the system comprising:
   an optical sensor continuously disposed on the assembly at a position on the path, said sensor having initial and terminus ends;
   a light emitter for transmitting an optical signal from said initial end;
   a light detector for receiving said optical signal from at least one of said initial end and said terminus end; and a signal analyzer for comparing said optical signal from said detector to a quantifiable deflection of the assembly.

2. The measurement system according to claim 1, wherein said signal analyzer issues an alarm indication in response to said quantifiable deflection exceeds a hazard-condition threshold.

3. The measurement system according to claim 1, wherein said optical sensor includes at least one of a single-mode fiber and a multi-mode fiber.

4. The measurement system according to claim 1, wherein said optical sensor is a light transmitting fiber disposed longitudinally along the assembly.

5. The measurement system according to claim 1, wherein said optical sensor is a light transmitting fiber disposed helically along the assembly.

6. The measurement system according to claim 1, wherein said optical sensor is a ribbon that contains a plurality of optical fibers enveloped within a sheath and transversely arranged in linear series.

7. A method for monitoring a launcher assembly along a path along which to accelerate a projectile, the method comprising:
disposing an optical sensor onto the assembly at a position on the path, said cable having initial and terminus ends;
transmitting an optical signal from said initial end;
receiving said optical signal for detection from at least one of said initial end and said terminus end; and
comparing said optical signal upon reception to a quantifiable deflection of the assembly.

8. The method according to claim 7, further comprising:
issuing an alarm indication in response to said quantifiable deflection exceeding a hazard-condition threshold.

9. The method according to claim 7, wherein disposing said optical sensor comprises disposing at least one of a single-mode fiber and a multi-mode fiber.

10. The method according to claim 7, wherein disposing said optical sensor comprises disposing onto the assembly said optical sensor that constitutes a light transmitting fiber disposed longitudinally along the assembly.

11. The method according to claim 7, wherein disposing said optical sensor comprises disposing onto the assembly said optical sensor that constitutes a light transmitting fiber disposed helically along the assembly.

12. The method according to claim 7, wherein disposing said optical sensor comprises disposing onto the assembly a ribbon that contains a plurality of optical fibers enveloped within a sheath and transversely arranged in linear series.

* * * * *